United States Patent
Maier

(10) Patent No.: US 11,612,285 B2
(45) Date of Patent: Mar. 28, 2023

(54) SUCTION HOSE FOR A VACUUM CLEANER

(71) Applicant: Festool GmbH, Wendlingen (DE)

(72) Inventor: Steffen Maier, Weißenhorn (DE)

(73) Assignee: Festool GmbH, Wendlingen (DE)

( * ) Notice: Subject to any disclaimer, the term of this patent is extended or adjusted under 35 U.S.C. 154(b) by 260 days.

(21) Appl. No.: 16/629,850

(22) PCT Filed: Jun. 19, 2018

(86) PCT No.: PCT/EP2018/066195
§ 371 (c)(1),
(2) Date: Jan. 9, 2020

(87) PCT Pub. No.: WO2019/011591
PCT Pub. Date: Jan. 17, 2019

(65) Prior Publication Data
US 2021/0076890 A1    Mar. 18, 2021

(30) Foreign Application Priority Data

Jul. 12, 2017  (DE) .......................... 102017115653.4

(51) Int. Cl.
*A47L 7/00*    (2006.01)
*A47L 5/36*    (2006.01)
(Continued)

(52) U.S. Cl.
CPC .............. *A47L 7/0095* (2013.01); *A47L 5/362* (2013.01); *A47L 7/009* (2013.01); *A47L 9/242* (2013.01);
(Continued)

(58) Field of Classification Search
CPC ........ A47L 7/0095; A47L 7/009; A47L 9/242; A47L 9/246; A47L 9/248; A47L 9/2857;
(Continued)

(56) References Cited

U.S. PATENT DOCUMENTS 3,300,571 A * 1/1967 Downey .............. H01B 7/0072
138/131
3,614,705 A * 10/1971 Descarries .............. A47L 9/246
439/23
(Continued)

FOREIGN PATENT DOCUMENTS

CN    2142694 Y    9/1993
CN    2274472 Y    2/1998
(Continued)

OTHER PUBLICATIONS

Examination Report from the Chinese Patent Application dated Sep. 24, 2020.

*Primary Examiner* — Joseph J Hail
*Assistant Examiner* — Robert C Moore
(74) *Attorney, Agent, or Firm* — Hoffmann & Baron, LLP

(57) ABSTRACT

A suction hose for a vacuum cleaner including a hose portion, which has a flexible dust removal hose body and a flexible jacket hose body, in which the dust removal hose body is arranged, wherein a suction flow channel for conducting a suction flow to the vacuum cleaner extends between longitudinal ends of the hose portion, which suction flow channel is bounded by a hose jacket of the dust removal hose body, a connection piece for connecting to the handheld power tool or to the vacuum cleaner is arranged at at least one longitudinal end of the hose portion, and the jacket hose body and the dust removal hose body extend into an (Continued)

interior of a hose receptacle of the connection piece such that the dust removal hose body is sheathed by the jacket hose body into the hose receptacle.

28 Claims, 3 Drawing Sheets

(51) Int. Cl.
    *A47L 9/24*      (2006.01)
    *B23Q 11/00*      (2006.01)
    *B24B 55/06*      (2006.01)

(52) U.S. Cl.
    CPC ............... *A47L 9/246* (2013.01); *A47L 9/248* (2013.01); *B23Q 11/0046* (2013.01); *B23Q 11/0071* (2013.01); *B24B 55/06* (2013.01)

(58) Field of Classification Search
    CPC ....... A47L 5/38; B24B 55/06; B23Q 11/0046; B23Q 11/0071
    USPC .......................................................... 15/414
    See application file for complete search history.

(56) References Cited

U.S. PATENT DOCUMENTS 5,042,844 A * 8/1991 Iida .......................... A47L 9/242
                                                    285/391
5,562,311 A * 10/1996 Sawtelle ............... F16L 33/225
                                                    285/249
2004/0103949 A1    6/2004 Rickards

FOREIGN PATENT DOCUMENTS

| | | | |
|---|---|---|---|
| CN | 1440713 A | 9/2003 | |
| CN | 102362077 A | 2/2012 | |
| DE | 10133234 A1 | 1/2003 | |
| DE | 102012020546 A1 | 4/2014 | |
| DE | 102013020687 A1 | 6/2015 | |
| EP | 0985372 A1 | 3/2000 | |
| EP | 1062902 A2 | 12/2000 | |
| EP | 2614762 A2 | 7/2013 | |
| FR | 2603971 A1 * | 3/1988 | ........ A47L 9/2894 |
| JP | S57-149854 U | 9/1982 | |
| JP | S61-17589 | 2/1986 | |
| JP | 2001309879 A | 11/2001 | |
| JP | 2010-246296 A | 10/2010 | |
| WO | WO-2016097106 A1 * | 6/2016 | ............ A47L 9/242 |

* cited by examiner

SUCTION HOSE FOR A VACUUM CLEANER

This application claims priority based on an International Application filed under the Patent Cooperation Treaty, PCT/EP2018/066195, filed Jun. 19, 2018, which claims priority to DE102017115653.4, filed Jul. 12, 2017.

BACKGROUND OF THE INVENTION

The invention relates to a suction hose for a vacuum cleaner, in particular for operation with a hand-held power tool, comprising a hose portion having a flexible dust removal hose body and a flexible jacket hose body, in which the dust removal hose body is located, wherein a suction flow channel for conducting a suction flow to the vacuum cleaner extends between longitudinal ends of the hose portion, which suction flow channel is bounded by a hose jacket of the dust removal hose body, wherein a connection piece for connection to the hand-held power tool or to the vacuum cleaner is arranged at at least one longitudinal end of the hose portion, and wherein the jacket hose body and the dust removal hose body extend into an interior of a hose receptacle of the connection piece, so that the dust removal hose body is sheathed by the jacket hose body into the hose receptacle. The invention further relates to a method for producing such a suction hose.

Such a suction hose is presented in EP 0 985 372 A1, for example. It is difficult, however, to connect the suction hose to the connection piece. It is in particular necessary to insert the jacket hose body into the hose receptacle and to maintain its reliable hold there.

SUMMARY OF THE INVENTION

The present invention is therefore based on the problem of providing a suitable connection between the hose portion and the connection piece.

To solve this problem, it is provided in a suction hose of the type referred to above that a mounting section of the dust removal hose body protrudes beyond the jacket hose body in the hose receptacle, and that a holding element is fastened to an outer jacket surface of the jacket hose body, which holding element covers an end face of the jacket hose body, which end face is free towards the mounting section of the dust removal hose body, the holding element lying against an inner surface of the hose receptacle.

The method according to the invention for producing a suction hose for a vacuum cleaner, in particular for operation with a hand-held power tool, wherein the suction hose comprises a hose portion having a flexible dust removal hose body and a flexible jacket hose body, in which the dust removal hose body is located, wherein a suction flow channel for conducting a suction flow to the vacuum cleaner extends between longitudinal ends of the hose portion, which suction flow channel is bounded by a hose jacket of the dust removal hose body, wherein a connection piece for connection to the hand-held power tool or to the vacuum cleaner is arranged at at least one longitudinal end of the hose portion, and wherein the jacket hose body and the dust removal hose body extend into an interior of a hose receptacle of the connection piece, so that the dust removal hose body is sheathed by the jacket hose body into the hose receptacle, provides the arrangement of the jacket hose body and the dust removal hose body relative to each other or the cross-cutting of the jacket hose body in such a way that a mounting section of the dust removal hose body projects in front of the jacket hose body in the hose receptacle, the fixing of a holding element to an outer jacket surface of the jacket hose body in such a way that the holding element covers an end face of the jacket hose body, which end face is free towards the mounting section of the dust removal hose body, and the insertion of the mounting section and the jacket hose body with the holding element into the hose receptacle, so that the holding element lies against an inner surface of the hose receptacle.

The invention further relates to a system with a suction hose and a vacuum cleaner and/or a hand-held power tool as a terminal device.

It is a basic idea of the present invention that the jacket hose body is, as it were, partially sheathed using a holding element, whilst its free end face projecting towards the hose receptacle is completely or partially covered by the holding element as it were, so that the hose portion can be inserted better into the hose receptacle. In addition, the holding element provides a hold for the jacket hose body.

It can be provided that the holding element compresses the jacket hose body in the direction of the dust removal hose body. The holding element can constrict the jacket hose body as it were or reduce its diameter, so that it can be inserted into the hose receptacle more easily.

The term "insertion" should preferably cover "screwing in" as well. For a screwing-in or tightening movement of the connecting piece and the hose portion relative to each other is an insertion movement on which a rotary movement is superimposed. In each case the hose portion and the connecting piece can be assembled more easily if the holding element holds or prefixes the jacket hose body.

It is advantageously provided that the holding element extends along the entire circumference or along a part of the circumference of the jacket hose body. In this, it is for example possible for the holding element to cover one or more part-circumferences of the jacket hose body. The holding element has suitable ring segments or angle segments for example, i.e. it can be segmented. It is furthermore possible for the holding element to represent a continuous body or wall surface in the region of the jacket hose body, while having recesses, slots or the like in the region of the mounting section of the dust removal hose body.

It is expedient if the holding element has an annular or sleeve-type shape when mounted on the jacket hose body. The holding element can thus be a sleeve, a ring or the like for example. It is, however, also possible that the holding element initially has a tape-like shape, being designed as a holding tape, for example, which can be "laid" or mounted around the free end of the jacket hose body, so that it has an annular or sleeve-type shape only in the mounted state.

An advantageous concept provides that the holding element is a holding element which can be deformed, in particular plastically and/or flexibly, by the connection piece while the connection piece is being fitted to the hose portion. This means that the holding piece yields while the connection piece is being fitted to the hose portion (or vice versa) and adapts to the inner circumferential contour of the connection piece, for example. In this process, a thread contour, a helical contour, a step contour or the like can for example be "impressed" into the holding element as it were. The holding element can be deformed in both ways, i.e. plastically and flexibly. It is therefore possible for the holding element to maintain the deformation suffered during the assembly of the connection piece and the hose portion.

Conceivable and advantageous in practical applications is a holding element which is made wholly or partially of metal. However, a plastic holding element can experience a permanent and/or flexible deformation during the assembly of the connection piece and the hose portion.

It is an expedient measure that the holding element is secured to the jacket hose body and/or to the dust removal hose body, in particular by bonding or an adhesive layer. The end of the jacket hose body, for example, which is covered by the holding element, can be provided with a liquid or paste-like adhesive before the holding element is fixed. A combination in which adhesive is applied to the jacket hose body on the one hand and the holding element has an adhesive layer on the other hand is possible as well. The adhesive layer can for example be covered by a covering body such as a protective film or the like before the holding element is applied to the jacket hose body.

As an alternative to bonding, however, welding or a positive-locking connection, for example using rivets or the like, is suitable for securing the holding element to the jacket hose body as well.

In the same way, the holding element can be secured to the dust removal hose body as well, for example by bonding, welding or the like.

An advantageous concept provides that the holding element extends parallel to the longitudinal dimension of the suction flow channel at least along a subsection of the mounting section of the dust removal hose body. The holding element is therefore expediently not only located on the jacket hose body, but on the dust removal hose body as well. The holding element is expediently permanently joined to the dust removal hose body, for example by bonding, welding or the like. With respect to the longitudinal dimension of the suction flow channel and/or along a longitudinal axis of the connection piece (which can be the insertion axis as well), the holding element overlaps the jacket hose body and the dust removal hose body to approximately the same extent. This facilitates a regular and uniformly firm connection and/or support of the holding element to/on the jacket hose body and the dust removal hose body.

It is advantageously provided that the holding element has in the region of the free end face of the jacket hose body a ramp for the connection piece to slide onto the jacket hose body during assembly, in particular when plugging or screwing the connection piece onto the hose portion. The ramp for example extends as it were from the mounting section radially outwards to the jacket hose body or its outer surface respectively.

At this point it should be mentioned that the connection piece and/or the hose portion advantageously has/have a substantially circular cross-section. Alternatively, however, an elliptical, polygonal or oval cross-section of the connection piece and/or the hose portion is possible as well. The cross-section can obviously be changed by deformation, e.g. the application of a load, a kinking of the suction hose or the like. In the region of the connection piece in particular, several substantially circular cross-sections of the connection piece and the hose portion are possible. It is furthermore possible that several cross-sectional contours are provided at different longitudinal sections of the suction hose.

An advantageous concept provides that the holding element comprises or is represented by a tape body, in particular an adhesive tape or a plastic adhesive tape or a metal adhesive tape. The adhesive tape, which may be made of plastic and/or metal for example and can therefore be a sandwich adhesive tape, can easily be applied to the jacket hose body. The adhesive tape can furthermore have a compression effect if it is applied to the jacket hose body with suitable firmness. The tape body can, however, be provided without an adhesive layer as well. The adhesive may for example, as mentioned above, be applied to the jacket hose body and/or to the dust removal hose body, followed by fixing the initially not adhesive tape to both or one of said components.

It is expediently provided that the holding element comprises or is represented by a metal body, in particular a sheet metal part and/or a metal adhesive tape. It is furthermore possible that the holding element comprises a metal body, e.g. a sheet metal body or the like. A metal sleeve can easily be used for example. The metal sleeve or the metal body in general can be deformed by assembling the hose portion and the connection piece.

An advantageous concept provides that the holding element is a shrinkable body which is shrunk by thermal treatment, in particular by heating, onto the jacket hose body for a hold at the jacket hose body and/or the dust removal hose body. It is furthermore possible that the holding element comprises a shrinkable body or is a shrinkable body. A thermal treatment, in particular by heating, can for example reduce the dimensions of the shrinkable body to such an extent that it is held on the jacket hose body or the dust removal hose body or both parts. The shrinkable body can in particular extend to the mounting section or cover a part of the mounting section, so that it is held simultaneously on both hose bodies by virtue of its shrinking or thermal treatment. Bonding may obviously be provided in addition to the thermal treatment.

It is furthermore advantageous if the holding element is electrically conductive.

It is expediently provided that the holding element is electrically conductive, having an electrically conductive coating in particular, for establishing an electric connection between at least two of the components connection piece, jacket hose body and dust removal hose body. As it were, the holding element provides an electric connection between e.g. the jacket hose body and the connection piece, or the dust removal hose body and the jacket hose body or the dust removal hose body and the connection piece.

In this way, for example, an antistatic connection or a conductive connection can be established for dissipating electric charge. The suction hose can for example be electrically conductive beyond the hose portion and connected by the likewise electrically conductive connection piece to the vacuum cleaner for earthing or other electric connection.

The electrically conductive coating or the conductivity of the holding element can, however, also be used for communicating electric signals, in particular control signals, shut-down signals or the like, via the suction hose.

An advantageous concept provides that the holding element has or is represented by an electrically conductive metal foil. The electrically conductive metal foil can for example be a part of an adhesive tape or be designed as a foil body without any adhesive properties of its own. The metal foil is particularly suitable for plastic deformation when the connection piece and the hose portion are connected to or mounted on each other.

It is expedient if the dust removal hose body and/or the jacket hose body is/are electrically conductive and/or has/have and/or is/are represented by an electrically conductive plastic material and/or has/have at least one electrically conductive wire. It would obviously also be possible that an electric conductor, e.g. a wire or the like, is provided between the dust removal hose body and the jacket hose body or at another point of the hose portion. Advantageous, however, is a metallic coating, a carbon fibre application or the like for making the hose bodies electrically conductive.

It is expediently provided that the hose jacket of the dust removal hose body has at least one plastic wall and/or at least one reinforcement body and/or at least one reinforcement spiral, in particular made of metal or of a plastic material which is more rigid than a base wall of the hose jacket, and/or at least one rib structure extending helically in particular. The hose jacket may for example have an electrically conductive or an electrically non-conductive plastic wall. A reinforcement spiral, e.g. a wire or the like, may be embedded into the material of the hose jacket as well. The hose jacket of the dust removal hose body may also have a rib structure, e.g. a spiral or the like. This reinforces it on the one hand while making it bendable and deformable on the other hand.

It is easily possible that the jacket hose body has a plastic wall and/or a reinforcement body and/or a rib structure as well. It is however preferred if jacket hose body has a smoother structure than the dust removal hose body. For at this point it should be mentioned that the jacket hose body sheathes a rib structure for example, or another structure of the dust removal hose body with a snagging tendency. This makes handling easier. The jacket hose body may for example consist of a textile material or have a smooth plastic surface. Compared to the dust removal hose body, the jacket hose body may be softer and/or more easily deformed. The jacket hose body as it were forms a cover for the suction flow hose body. Hence the suction flow hose body is preferably more rigid than the jacket hose body.

The jacket hose body has a plastic film or a plastic wall for example. Other materials which are preferably smoother or less rough than an outer contour of the suction flow hose body can be used in the jacket hose body as well.

An advantageous concept provides that the jacket hose body consists of textile fibres and/or has a textile mesh and/or is designed as a multifilament consisting of interwoven harder and softer fibres. The jacket hose body for example has a mesh of plastic fibres, in particular polyamide fibres and/or polyester fibres. It is preferred if the jacket hose body is designed as a multifilament of a fabric of different fibres, such as textile and plastic fibres, harder and softer fibres or the like. The harder and softer fibres may for example be polyamide fibres and polyester fibres. The diameter of the fibres can also contribute to their being harder or softer. It is possible for the suction flow hose body to be inserted into the jacket hose body or located therein in another way. It is preferred, however, if the jacket hose body is formed by braiding around the suction flow hose body. In this case, the fabric of the jacket hose body is braided around the suction flow hose body.

It is expediently provided that the end face of the jacket hose body which is free towards the mounting section of the dust removal hose body has a smaller diameter than a section of the jacket hose body which is more distant from the mounting section of the dust removal hose body, the smaller diameter being in particular produced by a thermal treatment and/or by a crosscut and/or by a welding of the jacket hose body. A material of the jacket hose body, e.g. a plastic/textile fabric, a plastic film or the like, is as it were shrunk by a crosscut, a separate thermal treatment such as heating or the like, whereby the end face towards the mounting section of the dust removal hose body is formed. This end face is in any case constricted or has a shrinkage. It is furthermore possible that the jacket hose body is produced by braiding around the dust removal hose body. The free ends of the individual fibres are cut off thermally, for example, to form the end face towards the mounting section. This thermal cutting results in a welding or shrinking effect, which advantageously contributes to or forms the above measure.

An advantageous concept provides that at least the mounting section of the dust removal hose body and preferably the jacket hose body as well is/are accommodated in a holding sleeve of the connection piece which is accommodated, in particular freely rotatably, in a holding receptacle of a plug-in body of the connection piece which is separate from the holding sleeve and in particular held to the plug-in body by a sleeve-shaped or annular holding body, the plug-in body having a plug-in section for plugging onto and in particular into a plug-in receptacle of the hand-held power tool or the vacuum cleaner. The holding sleeve can be fixed or rotatable in the plug-in body. The plug-in body has a plug-in projection or a plug-in receptacle, for example. It is also possible for the plug-in body to have both, i.e. a plug-in projection and a plug-in receptacle. The plug-in body may further be or comprise a screw body. The screw body can be screwed to the hose connection of the vacuum cleaner or the hand-held power tool by way of a screw contour. A screw contour may for example be provided at a plug-in section of the plug-in body.

The holding sleeve can be permanently located in the plug-in body, in particular if it is bonded.

It is also possible that the holding sleeve is latched to the plug-in body, for example by way of latching means. The plug-in body and/or the holding sleeve may for example have at least one latching projection and/or latching receptacle. If latched, the holding sleeve can be located at the plug-in body in a fixed or rotatable manner It is expediently provided that the hose receptacle has a reception opening for the insertion of the hose portion and a base region or end region remote from the reception opening, wherein the reception opening has a larger cross-section than the base region or end region and/or the interior narrows from the reception opening towards the base region or end region, in particular conically. The cross-section is circular or round, for example. A conical course can be provided between the reception opening and the base region or end region. This means that the hose receptacle as a whole is conical, for example. A stepped shape is also possible, however, so that the reception opening has a larger cross-section or diameter, for example, and at least one step is provided between the hose receptacle and the base region or end region. It is furthermore possible that only the base region has a narrow inner circumference, for example for the mounting section of the dust removal hose body, while the reception opening has a larger diameter.

It is advantageously provided that the hose receptacle has at least one threaded section for screwing in a screw contour located at the outer circumference of the dust removal hose body. As mentioned above, the dust removal hose body can for example have a spiral or helical reinforcement at its outer circumference, such as ribs or a thread contour formed integrally into the hose body. The dust removal hose body can also be provided with a reinforcement body, e.g. a wire spiral. These as it were natural or existing threaded sections or screw contours of the dust removal hose body are for example used for screwing to the threaded section of the hose receptacle. In the region of the mounting section of the dust removal hose body, the screw contour is exposed and can be used for screwing to the threaded section.

It is advantageously provided that the at least one holding element is located in the region of the threaded section and deformed helically by the threaded section. The holding element is plastically or elastically deformable, for example, and is deformed by the threaded section of the holding sleeve or the hose receptacle.

It is advantageously provided that the threaded section has a larger diameter in the region of a reception opening of the hose reception provided for inserting the hose portion than in a base region or end region of the hose receptacle remote from the reception opening. The thread contours or screw contours of the threaded section have a continuous narrowing, for example.

It is possible that individual windings or at least one winding of the threaded section, in particular in the region of the reception opening or immediately thereat, has/have no narrowing and a thread contour adjoining it/them in the direction of the base region or end region and having a narrowing is provided. The diameters or thread structures which are larger in the region of the reception opening facilitate the mounting of the above-mentioned holding sleeve or the connection piece on the hose portion, for example. The relatively wide windings in the region of the reception opening or the larger diameter of the reception opening make is possible in particular for the reception opening to slide onto the holding element and onto the jacket hose body in particular as it were.

At the thread contour or another point of the hose receptacle, for example, there can be provided a contact projection or a contact face or the like for establishing an electric connection to the holding element and/or at least one of the hose bodies.

At this point it should also be mentioned that the holding element advantageously has a substantially smaller thickness than the jacket hose body or the suction flow hose body, being for example made of a material with no more than a third of the thickness of one of the two above hose bodies.

BRIEF DESCRIPTION OF THE DRAWINGS

An embodiment of the invention is explained below with reference to the drawing, of which.

DETAILED DESCRIPTION

Figure 1:
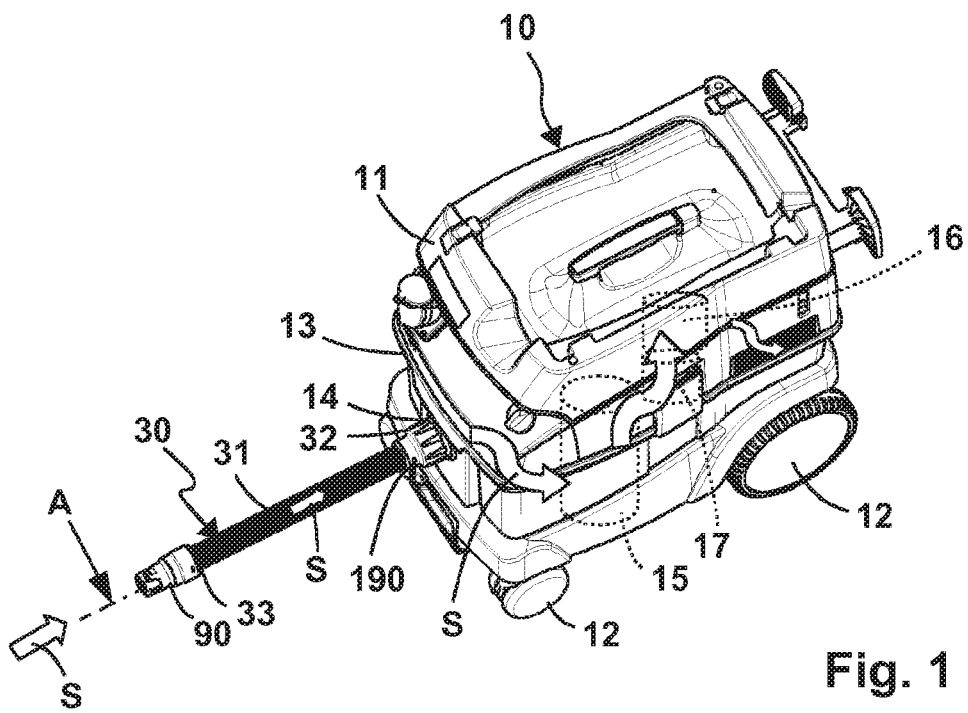
FIG. 1 is a perspective oblique view of a vacuum cleaner with a suction hose according to the invention.
Figure 2:
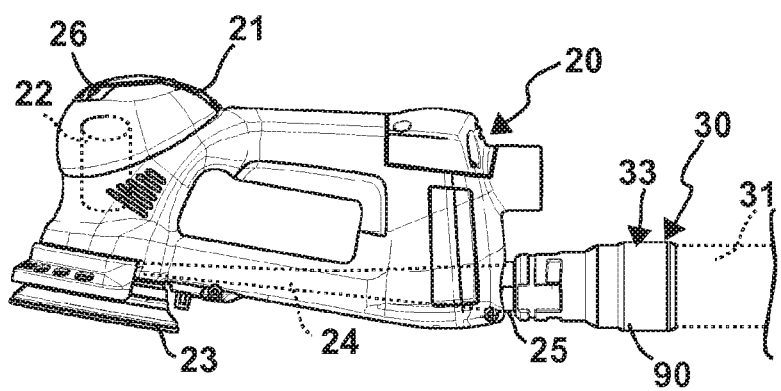
FIG. 2 is a side view of a hand-held power tool with a connected suction hose according to the invention.

A vacuum cleaner 10 has a vacuum cleaner housing 11, which is mobile. The vacuum cleaner 10 is a mobile vacuum cleaner being, by way of example, a vacuum cleaner which can be used as a workshop cleaner on site and is mobile. The vacuum cleaner 10 can roll on a ground, for which purpose castors 12 are provided. The vacuum cleaner 10 represents other mobile vacuum cleaners, for example those which are located in a transport box or have a housing in the shape of a transport box. The transport box can expediently be linked to other transport boxes, e.g. stacked and/or joined positively and/or locked. Such transport boxes are then preferably used to accommodate power tools of the type of the hand-held power tool 20 shown in FIG. 2.

The hand-held power tool 20 for example has a machine housing 21, in which a drive motor 22, e.g. an electric or pneumatic drive motor, is located. The drive motor 22 forms a part of a drive train which may optionally include a gearbox. The drive motor 22 can drive a working tool 23 designed as a grinding wheel for example. The working tool 23 is an example for other working tools such as machining, milling, cutting, sawing or the like tools. The drive motor 22 can be switched on and off using a switch 26. The hand-held power tool 20 may for example be a grinding tool but can also be an example for other hand-held power tools, such as saws, milling tools, drills or the like. The operation of the hand-held power tool 20 generates dust, which flows via a dust removal channel 24 to an extraction port 25, to which a suction hose 30 can be connected. Via the extraction port 25, any dust generated in the operation of the hand-held power tool 20 and containing particles, chips or the like can be extracted.

With the suction unit 16 a suction flow S can be generated, whereby dust arising in the operation of the working tool 23 or the hand-held power tool 20 can be extracted. The suction hose 30 has a hose portion 31, the longitudinal ends 32, 33 of which can be releasably connected to the vacuum cleaner 10 and the hand-held power tool 20, in particular within a plug-in or screwing assembly process or the like. At this point it should be mentioned that a suction hose according to the invention can be connected permanently to a vacuum cleaner or a hand-held power tool at least at one longitudinal end. The longitudinal end 32 for example can therefore be inserted into a plug-in receptacle of the suction hose connector 14 or plugged onto a suitable coupling or connection piece. At the hand-held power tool 20, i.e. at the extraction port 25, a plug-in receptacle or a plug-in projection is expediently provided for connecting the suction hose 30.

The suction hose 30 as a whole is flexible, so that the hand-held power tool 20 and the vacuum cleaner 10 can be moved on site substantially without being impeded by the resistance of the suction hose 30.

The hose portion 31 has a dust removal hose body 40, the hose jacket 41 of which bounds a suction flow channel 45 for the suction flow S to the vacuum cleaner 10. The dust removal hose body 40 extends to the respective longitudinal ends 32, 33 of the hose portion 31. The hose jacket 41 is reinforced by reinforcement ribs 42. The reinforcement ribs 42 extend in a helical fashion, forming a reinforcement spiral 44 for example. The reinforcement spiral 44 or the reinforcement ribs 42 give(s) the dust removal hose body 40 a certain degree of flexural rigidity combined nevertheless with great flexibility. By way of the reinforcement spiral 44 or the reinforcement ribs 42, the flow cross-section of the suction flow channel 45 is maintained even under a load transverse to the longitudinal extent L of the suction hose portion.

The ribbing or rib structure provided by the reinforcement ribs 42 is admittedly disruptive in some respects. Such ribs or projections on the hose body for example have the result that, if a workpiece is machined by the hand-held power tool 20, there is friction at surfaces of a workpiece machined by the hand-held power tool 20, leading to local damage. The ribbing of the dust removal hose body 40 can furthermore get caught at a workshop floor, making handling more difficult.

To eliminate this problem situation, the dust removal hose body 40 is covered or sheathed as it were, using a jacket hose body 50. The jacket hose body 50 extends between the longitudinal ends 32, 33 of the hose portion 31. In the region of the longitudinal ends 32, 33, the dust removal hose body 40 projects in front of the jacket hose body 50 with mounting sections 43, however. The mounting sections 43 are used for mounting the hose portion 31 on connection pieces 90, 190 and in particular for tension-resistant mounting with respect to the longitudinal extent L.

The jacket hose body 50 has a hose jacket 51, which is much smoother than the hose jacket 41 of the dust removal hose body 40 and can therefore slide more easily along workshop surfaces on a ground or the like. The hose jacket 51 has an end face 52 facing the respective mounting section 43 at the longitudinal ends 32, 33 of the dust removal hose body 40, where it is crosscut.

The hose jacket 51 is designed as a textile mesh 55, for example. The dust removal hose body 40 in particular is as it were spun or woven around by the hose jacket 51, whereby the textile mesh 55 is formed. The textile mesh 55 is a multifilament with fibres 56, 57 which are interwoven. The fibres 56, 57 have opposite orientation, for example, so that a cross-weave is formed. The fibres 56, 57 are expediently made of different materials and/or strength and/or have different diameters. It is, however, also possible to use a textile mesh with similar and/or uniform fibres and/or having the same diameter.

The textile mesh 55 is advantageously close-meshed and/or dense, so that the jacket hose body 50 completely sheathes the dust removal hose body 40 or completely hides or covers the dust removal hose body 40.

The connection pieces 90, 190 are designed in several parts and comprise plug-in bodies 91, 191 and holding sleeves 70 held at the plug-in bodies 91, being for example latched or bonded there or held by holding bodies 90.

Figure 7:
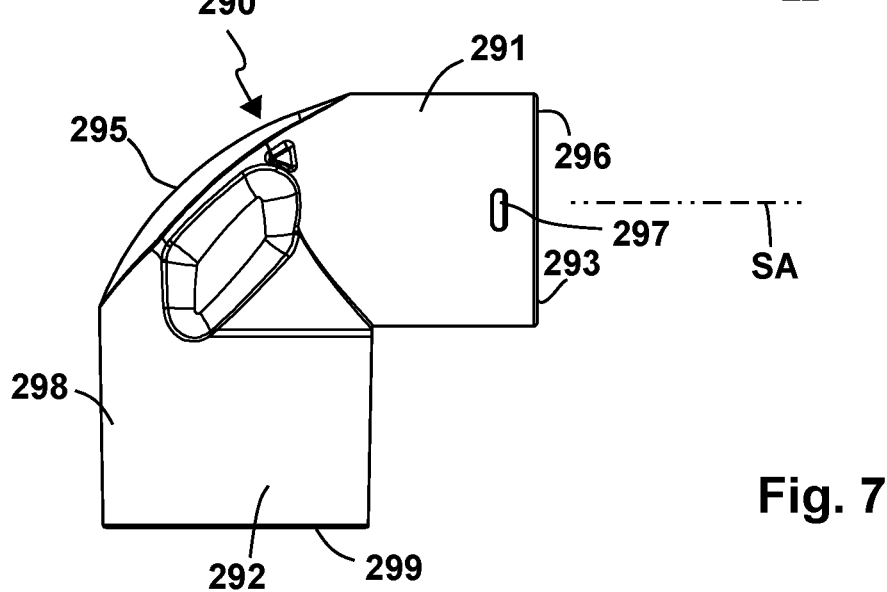
FIG. 7 shows an angle piece for the suction hose according to FIGS. 1, 3.

The holding sleeves 70 secure the hose portion 31 against tensile loads at the connection pieces 90, 190 and at a connection piece 290 shown in FIG. 7. The holding sleeves 70 are for example accommodated in holding receptacles 93, 193 or 293 of the connection pieces 90, 190 and 290 and are there held against tensile loads with respect to a plug-in axis SA, along which the holding sleeves 70 can be inserted into the holding/plug-in receptacles 93.

The plug-in bodies 91, 191 and 291 have plug-in sections 292 for plugging the suction hose 30 to a component required for suction operation, such as the vacuum cleaner 10, the hand-held power tool 20 and other types of vacuum cleaners and hand-held power tools. At the plug-in section 92 of the connection piece 90, for example, there is provided a plug-in receptacle 99, which can be plugged onto a connector, for example like at the hand-held power tool 20. At the outer circumference of the plug-in section 92, there are nevertheless provided positive-locking contours 98 suitable for a firm hold in a plug-in receptacle of another hand-held power tool not shown in the drawing. The positive-locking contours 98 are for example suitable for plugging into or unplugging from such a plug-in receptacle or an extraction port of a hand-held power tool. The plug-in section 92 can thus be used for several purposes. The plug-in section 92 is preferably made of a softer material than the section of the plug-in body 91 where the holding receptacle 93 is provided.

The plug-in section 192 of the plug-in body 191 is used for plugging onto or into the suction hose connector 14 of the vacuum cleaner. A plug-in receptacle 99 is provided at the plug-in section 192, for example. The plug-in projection or plug-in section 192 can obviously also be inserted into a corresponding plug-in receptacle with its circumferential wall 198, which preferably tapers towards the free end, for example if the suction hose connector 14 advantageously has a plug-in receptacle for inserting the plug-in section 192.

Only a part of the connection piece 290 is shown in FIG. 7. It also comprises the holding sleeve 70 not shown in FIG. 7 and the holding body 80, which can be seen in FIG. 6 above. An angle section 295 in particular extends between a holding receptacle 293 provided for the holding body 80 and the holding sleeve 70 and the plug-in section 292, so that the plug-in section 292 and the holding receptacle 293 are oriented at an angle to each other, for example an angle of 90 degrees. The respective plug-in axes SA and a plug-in axis not shown in FIG. 7 for plugging onto or into the vacuum cleaner 10 or a hand-held power tool 20 are oriented at an angle of 90 degrees to each other. A circumferential wall 298 of the plug-in section 292 is preferably conical towards its end region, so that it can easily be inserted into a plug-in receptacle, in particular into the plug-in receptacle of the suction hose connector 14 of the vacuum cleaner 10.

The holding receptacles 93, 193 and 293 are preferably identical or similar. An end face 96, 196, 296 for example forms a stop for a holding projection 82, in particular for a flange-type holding projection, of the holding body 80. The holding projection 82 in particular projects radially outwards in the manner of a flange and/or ring in front of a circumferential wall 81 of the holding body 80 and bears against the end face 96, 196 or 296 of a circumferential wall which bounds the holding receptacles 93, 193, 293.

The circumferential wall 81 on the other hand engages with the holding receptacle 93, 193,293. At the radial outer circumference of the circumferential wall 81, there are preferably provided supporting projections 83, which bear against an inner circumferential wall 95, 195 of the respective holding receptacle 93, 193, 293. The inner circumferential wall 95, 195 extends from the end face 96, 196, 296 to a base region 94, 194, where the holding sleeve 70 is supported. Between the base region or base wall 94, 194 and the free end face—remote from the holding projection 82—of the circumferential wall 81, the holding sleeve 90 is held. The respective holding sleeve 70 may however be freely rotatable in the holding receptacle 93, 193, so that the hose portion 93 can perform a rotary movement about its longitudinal extent L in the respective connection piece 90, 190, 290.

The holding bodies 80 can for example be bonded in the holding receptacles 93, 193, 293 or secured by other means. The preferred solution, however, is latching, for example by means of latching projections 84, which project in front of the circumferential wall 81, for example, and, when the holding body 80 is mounted on the plug-in body 91, 191, 291, engage with latching receptacles 97, 197, 297 of the plug-in body 91, 191, 291.

It is advantageous if recesses and/or sliding projections are provided in the holding receptacle 93, 193, 293 for the free rotation or movement of a respective holding sleeve 70. The holding sleeve (see FIG. 5) for example has radially outward-oriented sliding projections 79A, 79B, between which there is a recess 79C. The sliding projections 79A, 79B bear against the circumferential wall 95, 195 and facilitate an easy rotation of the holding sleeve 70 in the respective holding receptacle 93, 193, 293.

To secure the hose portion 31 on the connection pieces 90, 190, 290, each of the latter has a hose receptacle 35. The hose receptacle 35 is substantially defined by the holding sleeve 70 but can optionally be provided by the holding body 80 as well. The jacket hose body 50 bears against an inner circumferential wall 85 of the holding body 80, for example.

The holding body 80 is preferably designed as or represented by a type of sleeve. It is preferred if an inner diameter of a through-opening 86 of the holding body 80, through which the hose portion 31 including the jacket hose body 50 can be inserted, is so wide that the insertion movement is not impeded. The end face 52 of the jacket hose body 50 should therefore not hit the free end face 87 of the holding body 80 but easily slide into the through-opening 86. The insertion of the jacket hose body 50 through the holding body 80 is also facilitated by the holding element 60 to be described later.

The tension-resistant hold of the hose portion 31 at the connection pieces 90, 190, 290, on the other hand, is essentially provided by the holding sleeve 70. We can imagine that the end face 52 of the hose jacket 51 or the jacket hose body 50 is an obstacle when mounting the hose portion 31 on the respective connection piece 90, 190, 290, in particular the holding sleeve 70, and that it cannot easily be inserted into the connection piece 90, 190, 290, and that furthermore the jacket hose body 50 is held at the connection piece 90, 190, 290 in a tension-resistant manner with respect to the plug-in axis SA and/or its longitudinal extent L.

To eliminate this problem, the holding element 60 is provided; this covers with a covering section 62 a fastening section 53 of the jacket hose body 50, being located at an outer surface 54 of the hose jacket 51 and fastened with a covering section 63 to the mounting section 43 and/or covering the hose jacket 41 of the dust removal hose body 40. The covering sections 62, 63 preferably have approximately the same length with respect to the longitudinal extent L, having lengths L1 and L2 (see FIG. 6). The covering sections 62, 63 can obviously differ in length as well.

Between the covering sections 62, 63, a type of ramp 64 is formed, which extends over the end face 52 of the jacket hose body 50, therefore facing the mounting section 43. As a result, the longitudinal end 32, 33 of the hose portion 31 can slide into the hose receptacle 35 more easily, for example already into the through-opening 86 of the holding body 80. This, however, facilitates the further assembly and/or the hold at the holding sleeve 70 as well.

The holding element 60 or the tape body 61 is preferably represented by an adhesive tape 65, which is wound around the hose jacket 51. The adhesive tape 65 adheres to the hose jackets 41, 51 on an adhesive side which cannot be seen in the drawing and faces the hose jacket 41, 51. For better understanding the holding element 60 is in FIG. 6 shown with a butt with respect to the longitudinal end 31, so that a longitudinal end 65 of the adhesive tape 65 can be seen in the drawing.

Figure 6:
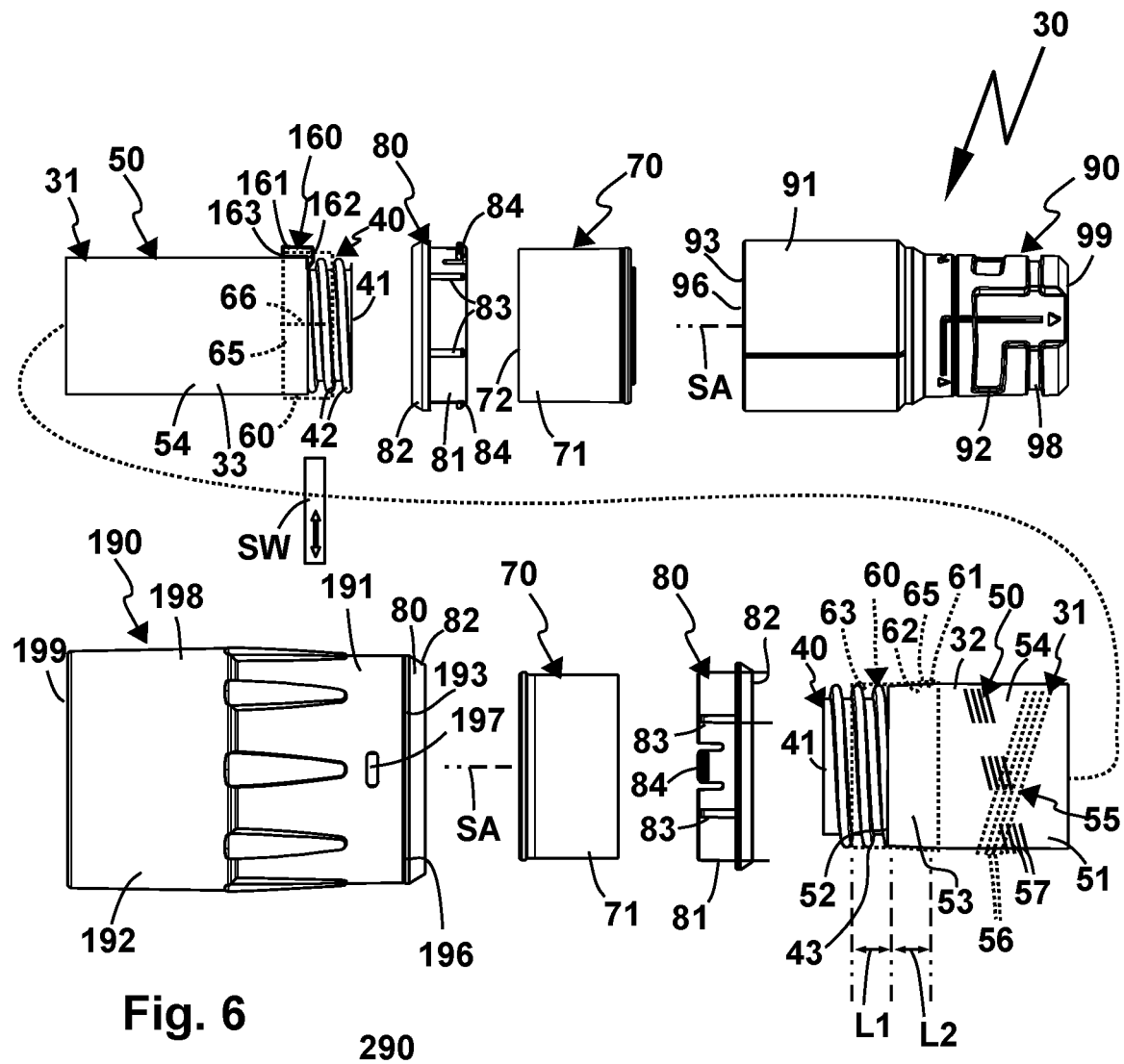
FIG. 6 is an exploded view of connection pieces of the suction hose according to FIG. 1.

The textile mesh 55 can easily be compressed by the adhesive tape 65, so that an outer diameter of the hose jacket 51 including the holding element 60 applied thereto in the region of the hose receptacle 35 or of the holding element 60 is smaller than away therefrom, e.g. towards the other the longitudinal end 32, 33, as shown in FIG. 6. The holding element 60 is indicated diagrammatically as an adhesive tape 65, and the compression of the textile mesh 55 or of the hose jacket 51 is shown in FIG. 6.

The longitudinal ends 32, 33 of the hose portion 31 are furthermore screwed to the holding sleeves 60. The holding sleeves 60 for example comprise a circumferential wall 71 providing a reception opening 72 for the insertion or screwing-in or both of the longitudinal end 32, 33 of the hose portion 31. The reception opening 72 is provided at the free end of a receptacle 78 for the respective longitudinal end 32, 33. The receptacle 78 is bounded by the inner circumferential surface 73 of the circumferential wall 71 and the base region 74.

An assembly option would now be the insertion of the respective longitudinal end 32, 33 into the receptacle 78 and its bonding there.

For inserting the longitudinal end 32, 33, it is advantageous that the inner circumferential surface 73 preferably has a conical trend, i.e. that it has a larger cross-section in the region of the reception opening 72 than in the base region 74. This conical trend is substantially defined by a thread of a threaded section 75. The inner circumferential surface 73 could be different from that shown in the drawing, but also planar or smooth, i.e. not having a thread.

The reinforcement spiral 44 or the reinforcement ribs 42 is/are substantially helical as mentioned above. They form a screw contour 46, which can be screwed to the threaded section 75 in the region of the mounting section 43 of the dust removal hose body 40.

Screw turns 76 of the threaded section 75 which are closer to the reception opening 72 have a larger diameter than one or more screw turns 77 close to the base region 74. This defines a substantially conical and/or narrowing shape of the receptacle 78 in such a way that the holding element 60 with the covering section 63 initially comes into engagement with the screw turns 76 and is then progressively compressed until the covering section 63 has its narrowest region in the region of the screw turns 77. This deforms the holding element 60, which comes to lie between the threaded section 75 and the screw contour 46, so that the holding element 60 is positively held in the thread structure formed by the threaded section 75 and the screw contour 46.

At the same time the covering section 62 preferably experiences a compression at the inner circumference of the holding body 80, i.e. at the inner circumference of the circumferential wall 81, so that it has a particularly good hold at the hose jacket 51.

Figure 4:
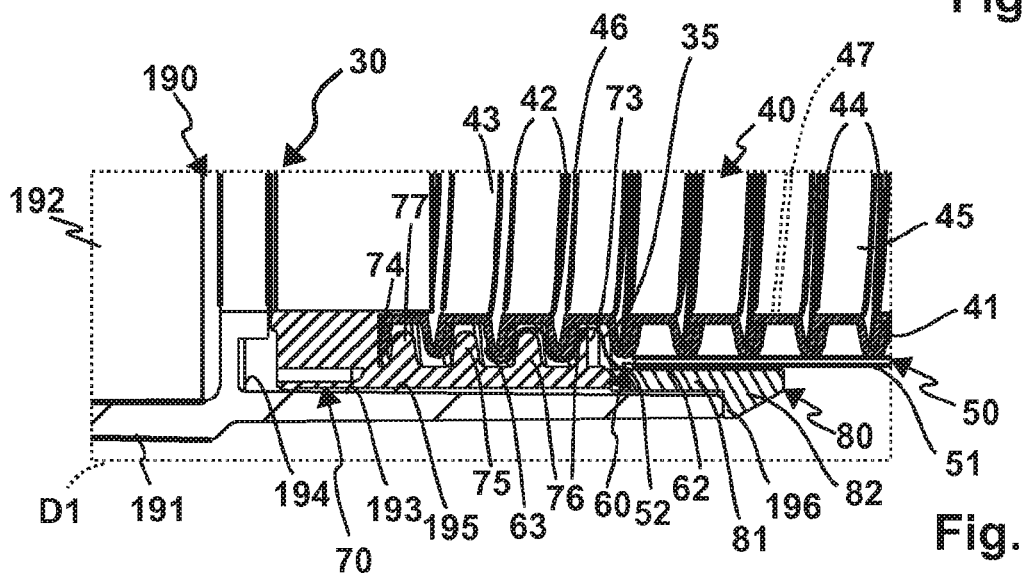
FIG. 4 shows a detail D1 from FIG. 3.
Figure 5:
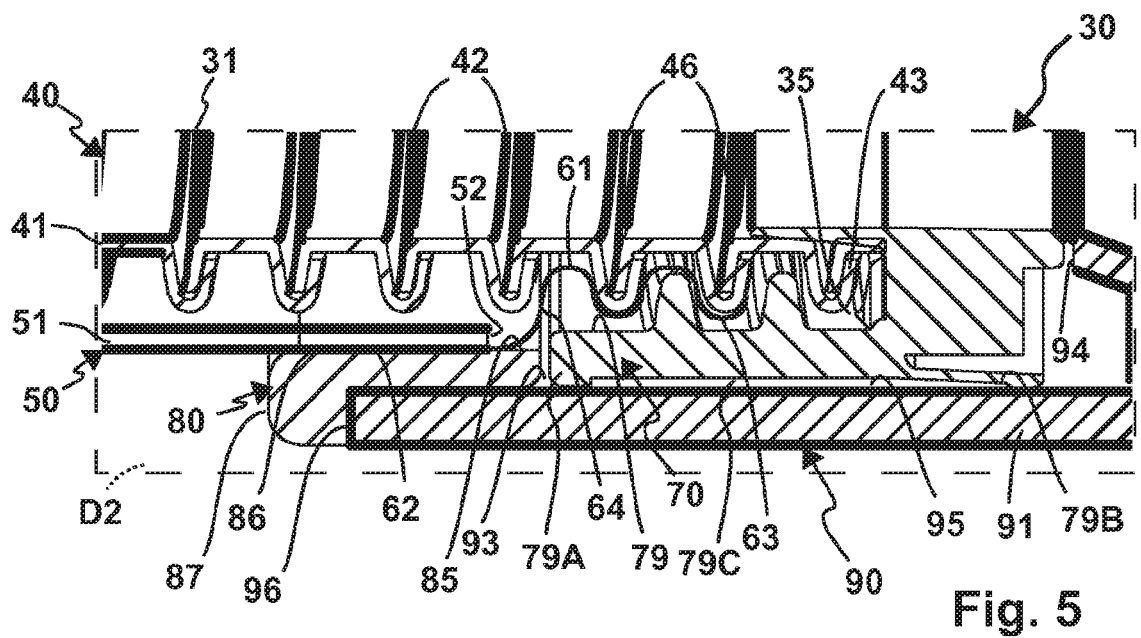
FIG. 5 shows a detail D2 from FIG. 3.

In contrast to the illustration of FIGS. 4 and 5, the hose jacket 51 of the jacket hose body 50 can obviously extend into the receptacle 78, so that it comes to lie in a region 79 of the receptacle 78 for example and there comes to lie in a sandwich arrangement between the hose jacket 41 and the inner circumferential wall or surface 73. This measure in particular facilitates the mounting of the holding body 80, because the respective longitudinal end 32, 33 is completely held in the holding sleeve 70 before the holding body 80 is connected to the plug-in body 91, 191, 291.

An alternative concept for a holding element is indicated diagrammatically in FIG. 6. In place of the tape body 61, for example, a holding element 160 can be provided which is designed in the manner of a sheet metal part of a clip. The holding element 160 for example comprises a metal body 163. The clip or the holding element 160 consists of metal in particular, preferably of light metal, aluminium or the like. The holding element 160 has a covering section 162, which is secured to the outer surface 54 of the jacket hose body 50, for example by bonding, crimping or the like. A ramp section or projecting section 162, which covers the end face 52 of the hose jacket 51, projects from the covering section 161. The holding element 160 can be annular, for example, and cover the end face 62 like a ring. It is however also possible that the holding element 160 covers only a sub-segment of the outer circumference of the hose jacket 51.

When crosscutting the hose jacket 51 of the jacket hose body 50, a cutting tool SW is expediently used (FIG. 6). The cutting tool SW for example has a blade body and/or a thermally heatable body. The thermal heating of the hose jacket 51, e.g. the textile mesh, which consists of plastic, has a shrinking effect, i.e. the diameter of the hose jacket 51 is smaller in the region of the end face 52 than in a region having a longitudinal distance therefrom, being remote from the end face 52. A region 58 with a smaller diameter reduced by crosscutting with the cutting tool SW near the end face 52 is indicated in FIG. 8.

The dust removal hose body 40 and/or the jacket hose body 50 is/are expediently electrically conductive. One or both of the hose jackets 41, 51 consisting of an electrically conductive material or have electrically conductive coatings, carbon fibres or the like. The holding element 60, 160 is expediently likewise electrically conductive, for example by virtue of a carbon or graphite coating, of metal components or the like. This facilitates antistatic discharge. The screw turns 77 or the at least one screw turn 77 is/are expediently likewise electrically conductive, thereby establishing an electric contact from the respective connection piece 90, 190, 290 to the holding element 60 and through the latter to the dust removal hose body 40 and/or the jacket hose body 50.

It is also possible for the dust removal hose body 40 to have a reinforcement body 47 on the shape of a wire spiral or the like (indicated in FIG. 4). This too can be used as an electrically conductive component.

Figure 8:
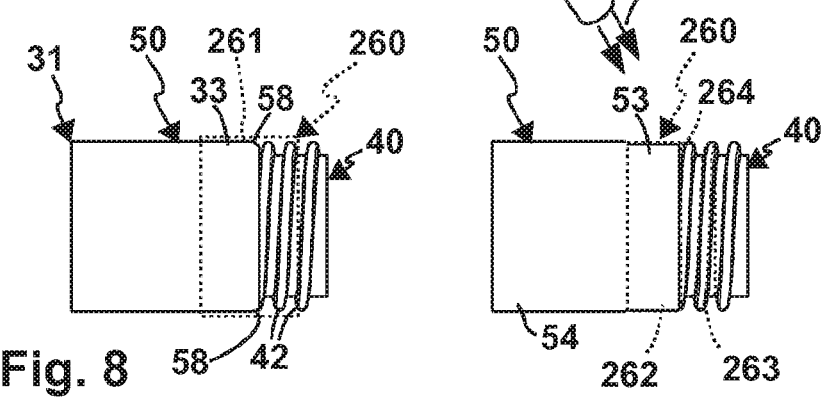
FIG. 8 shows a longitudinal end of a hose portion with a shrinkable body in a not yet shrunk state.
Figure 9:
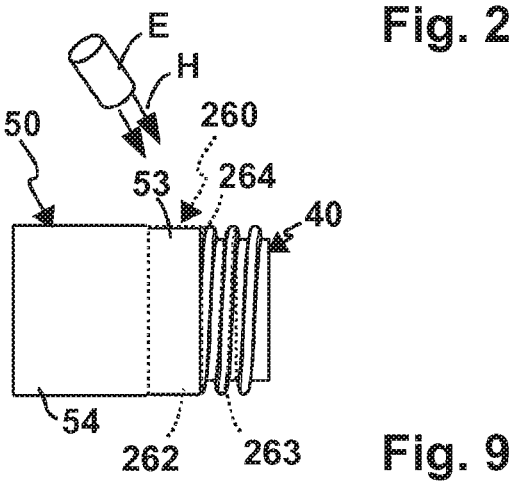
FIG. 9 shows the view according to FIG. 8, but with a shrunk shrinkable body.
Figure 3:
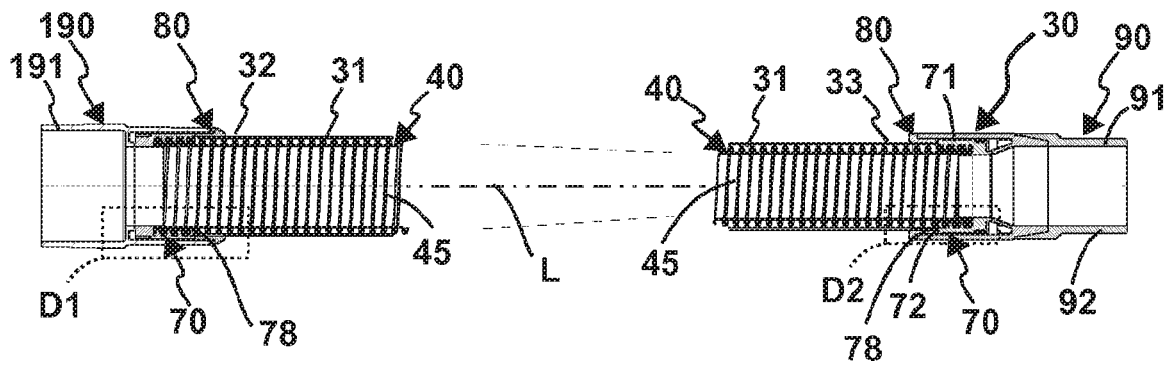
FIG. 3 is a sectional view of the suction hose according to FIG. 1, corresponding approximately to a sectional plane A.

FIGS. 8 and 9 show another embodiment in which a shrinkable body 261 is arranged as a holding element 260 on the longitudinal end 33 of the hose portion 31. The shrinkable body 261 is for example designed in the manner of a grommet or sleeve. In the not yet deformed state it can have the same cross-section along its entire length. It is also possible for the shrinkable body 261 to have a stepped or conical shape, so that it can be pushed onto the respective longitudinal end 32 or 33 from the free end of the mounting section 43, but has in a section 263, i.e. in the region of the mounting section 43, a smaller cross-section than in a section 262 provided for accommodating the jacket hose body 50.

The shrinkable body 261 consists of a material which shrinks when subjected to a thermal load, in particular heating, such as a plastic material. The shrinkable body 261 has a covering section 262 located at the fastening section 53 at the outer surface 54 of the jacket hose body 50. A further covering section 263, which adjoins the covering section 262, covers the mounting section 43 of the hose jacket 41 or the dust removal hose body 40. Between the covering sections 262, 263, a ramp 264 is formed if the shrinkable body 261 is heated by a heating tool E, e.g. a hair drier, with a heat jet H. The shrinkable body furthermore shrinks onto the screw contour 46 in such a way that the shrinkable body 261 at least partially reproduces the screw contour 46 and/or adopts its contour, so that the mounting section 43 sheathed by the shrinkable body 261 can be screwed into the threaded section 75.

The covering section 262 also shrinks when heat-treated with the heating tool E, so that it sits securely on the fastening section 53 of the hose jacket 51.

It is advantageously provided that the covering section 262 compresses the fastening section 53 of the hose jacket 51, reducing its cross-section. This measure likewise contributes to an easier mounting or securing of the longitudinal end 33 or 32 on the respective connection piece 90, 190, 290, in particular the holding sleeve 70.

At this point it should be mentioned that such a compression of the fastening section 53 can also be obtained by winding the tape body 61 around the longitudinal end 32, 33. The adhesive tape 65 can furthermore easily at least partially reproduce the screw contour 46 plastically and/or adopt its contour, so that the mounting section 43 sheathed by the adhesive tape 65 can be screwed into the threaded section 75.

The invention claimed is:

1. A suction hose for a vacuum cleaner for operation with a hand-held power tool, the suction hose comprising:
    a hose portion having a flexible dust removal hose body and a flexible jacket hose body, in which the dust removal hose body is located, wherein a suction flow channel for conducting a suction flow to the vacuum cleaner extends between longitudinal ends of the hose portion, which suction flow channel is bounded by a hose jacket of the dust removal hose body, the hose jacket having a helical reinforcement spiral forming an external screw contour;
    a connection piece for connection to the hand-held power tool or to the vacuum cleaner arranged at at least one longitudinal end of the hose portion, and wherein the jacket hose body and the dust removal hose body extend into an interior of a hose receptacle of the connection piece, so that the dust removal hose body is sheathed by the jacket hose body into the hose receptacle and wherein a mounting section of the dust removal hose body protrudes beyond the jacket hose body in the hose receptacle;
    a holding sleeve received within the hose receptacle of the connection piece, the holding sleeve having a threaded section with an internally threaded surface engaged with the external screw contour of the hose jacket;
    a holding body at least partially received within the hose receptacle of the connection piece for retaining the holding sleeve within the connection piece; and
    a holding element fastened to an outer jacket surface of the jacket hose body, the holding element covering an end face of the jacket hose body, the end face being free towards the mounting section of the dust removal hose body,
    wherein the holding element comprises a jacket hose body covering section, a dust removal hose body covering section and a ramp formed between the jacket hose body covering section and the dust removal hose body covering section, the jacket hose body covering section extending around the entire circumference of the jacket hose body and the dust removal hose body covering section extending around the entire circumference of the dust removal hose body, and the ramp extending between the holding sleeve and the holding body for the connection piece to slide onto the jacket hose body during assembly, when screwing the connection piece onto the hose portion,
    wherein the holding element is located in a region of the threaded section and deformed helically by the threaded section.

2. The suction hose according to claim 1, wherein the holding element has an annular or sleeve-type shape when mounted on the jacket hose body.

3. The suction hose according to claim 1, wherein the holding element is a holding element which can be deformed, plastically and/or flexibly, by the connection piece while the connection piece is being fitted to the hose portion.

4. The suction hose according to claim 1, wherein the holding element is secured to the jacket hose body and/or to the dust removal hose body by bonding or an adhesive layer.

5. The suction hose according to claim 1, wherein the holding element extends parallel to a longitudinal dimension of the suction flow channel at least along a subsection of the mounting section of the dust removal hose body.

6. The suction hose according to claim 1, wherein the holding element compresses the jacket hose body in the direction of the dust removal hose body.

7. The suction hose according to claim 1, wherein the holding element comprises or is represented by a tape body.

8. The suction hose according to claim 1, wherein the holding element comprises or is represented by a metal body.

9. The suction hose according to claim 1, wherein the holding element comprises or is a shrinkable body which is shrunk by thermal treatment, onto the jacket hose body for a hold on the jacket hose body and/or the dust removal hose body.

10. The suction hose according to claim 1, wherein the holding element is electrically conductive, having an electrically conductive coating for establishing an electric connection between at least two of the components connection piece, jacket hose body and dust removal hose body.

11. The suction hose according to claim 1, wherein the holding element has or is represented by an electrically conductive metal foil.

12. The suction hose according to claim 1, wherein the dust removal hose body and/or the jacket hose body is/are electrically conductive and/or has/have and/or is/are represented by an electrically conductive plastic material and/or has/have at least one electrically conductive wire.

13. The suction hose according to claim 1, wherein the reinforcement spiral of the hose jacket is made of metal or of a plastic material which is more rigid than a base wall of the hose jacket.

14. The suction hose according to claim 1, wherein the jacket hose body consists of textile fibers and/or has a textile mesh and/or is designed as a multifilament consisting of interwoven harder and softer fibers.

15. The suction hose according to claim 1, wherein the end face of the jacket hose body which is free towards the mounting section of the dust removal hose body has a smaller diameter than a section of the jacket hose body which is more distant from the mounting section of the dust removal hose body.

16. The suction hose according to claim 15, wherein the smaller diameter is produced by a thermal treatment and/or by a crosscut and/or by a welding of the jacket hose body.

17. The suction hose according to claim 1, wherein the hose receptacle has a reception opening for inserting the hose portion and a base region or an end region remote from the reception opening.

18. The suction hose according to claim 17, wherein the reception opening has a larger cross-section than the base region or the end region and/or the interior narrows from the receptacle opening towards the base region or end region.

19. The suction hose according to claim 1, wherein the threaded section has a larger diameter in a region of a reception opening of the hose receptacle provided for inserting the hose portion than in a base region or an end region of the hose receptacle more remote from the reception opening.

20. A suction hose for a vacuum cleaner for operation with a hand-held power tool, comprising a hose portion having a flexible dust removal hose body and a flexible jacket hose body, in which the dust removal hose body is located, wherein a suction flow channel for conducting a suction flow to the vacuum cleaner extends between longitudinal ends of the hose portion, which suction flow channel is bounded by a hose jacket of the dust removal hose body, wherein a connection piece for connection to the hand-held power tool or to the vacuum cleaner is arranged at least one longitudinal end of the hose portion, and wherein the jacket hose body and the dust removal hose body extend into an interior of a hose receptacle of the connection piece, so that the dust removal hose body is sheathed by the jacket hose body into the hose receptacle and wherein a mounting section of the dust removal hose body protrudes beyond a free end of the jacket hose body in the hose receptacle, and wherein a holding element is fastened to an outer jacket surface of the jacket hose body, the holding element covering an end face of the jacket hose body, the end face being free towards the mounting section of the dust removal hose body, the holding element lying against an inner surface of the hose receptacle, and wherein the holding element has, in a region of the free end face of the jacket hose body, a ramp for the connection piece to slide onto the jacket hose body during assembly, when plugging or screwing the connection piece onto the hose portion, the ramp extending over both the jacket hose body and the dust removal hose body, whereby the ramp covers the free end of the jacket hose body to enable a screwing in of the mounting section of the dust removal hose body into the hose receptacle of the connection piece, and wherein the hose receptacle has at least one threaded section for screwing in a screw contour located at the outer circumference of the dust removal hose body, and wherein the holding element is located in a region of the threaded section and deformed helically by the threaded section.

21. The suction hose according to claim 20, wherein the holding element is electrically conductive, having an electrically conductive coating for establishing an electric connection between at least two of the components connection piece, jacket hose body and dust removal hose body, and wherein at least the mounting section of the dust removal hose body is accommodated in a holding sleeve of the connection piece which is accommodated, freely rotatably, in a holding receptacle of a plug-in body of the connection piece which is separate from the holding sleeve and held to the plug-in body by a sleeve-shaped or annular holding body, the plug-in body having a plug-in section for plugging into a plug-in receptacle of the hand-held power tool or the vacuum cleaner.

22. The suction hose according to claim 20, wherein at least the mounting section of the dust removal hose body is accommodated in a holding sleeve of the connection piece which is accommodated, freely rotatably, in a holding receptacle of a plug-in body of the connection piece which is separate from the holding sleeve and held to the plug-in body by a sleeve-shaped or annular holding body, the plug-in body having a plug-in section for plugging into a plug-in receptacle of the hand-held power tool or the vacuum cleaner, and wherein the dust removal hose body has an external thread formed on an outer surface thereof and the hose receptacle has an internal threaded section for screwing in the external thread of the dust removal hose body.

23. A suction hose for a vacuum cleaner for operation with a hand-held power tool, comprising a hose portion having a flexible dust removal hose body and a flexible jacket hose body, in which the dust removal hose body is located, wherein a suction flow channel for conducting a suction flow to the vacuum cleaner extends between longitudinal ends of the hose portion, which suction flow channel is bounded by a hose jacket of the dust removal hose body, wherein a connection piece for connection to the hand-held power tool or to the vacuum cleaner is arranged at least one longitudinal end of the hose portion, and wherein the jacket hose body and the dust removal hose body extend into an interior of a hose receptacle of the connection piece, so that the dust removal hose body is sheathed by the jacket hose body into the hose receptacle and wherein a mounting section of the dust removal hose body protrudes beyond the jacket hose body in the hose receptacle, and wherein a holding element is fastened to an outer jacket surface of the jacket hose body, the holding element covering an end face of the jacket hose body, the end face being free towards the mounting section of the dust removal hose body, the holding element lying against an inner surface of the hose receptacle, and wherein the holding element is formed as an adhesive tape body wound around the jacket hose body, and wherein the jacket hose body comprises fibers woven into a textile mesh, the textile mesh being compressed by the adhesive tape body so that an outer diameter of the jacket hose body, including the holding element, in a region of the hose receptacle is smaller than an outer diameter of the jacket hose body in a region more distant from the mounting section of the dust removal hose body.

24. The suction hose according to claim 23, wherein the holding element extends along the entire circumference or along a part of the circumference of the jacket hose body.

25. The suction hose according to claim 23, wherein the holding element has, in a region of the free end face of the jacket hose body, a ramp for the connection piece to slide onto the jacket hose body during assembly, when plugging or screwing the connection piece onto the hose portion.

26. The suction hose according to claim 23, wherein the hose jacket of the dust removal hose body has at least one rib structure extending helically.

27. The suction hose according to claim 23, wherein at least the mounting section of the dust removal hose body is accommodated in a holding sleeve of the connection piece which is accommodated, freely rotatably, in a holding receptacle of a plug-in body of the connection piece which is separate from the holding sleeve and held to the plug-in body by a sleeve-shaped or annular holding body, the plug-in body having a plug-in section for plugging into a plug-in receptacle of the hand-held power tool or the vacuum cleaner.

28. The suction hose according to claim 23, wherein the hose receptacle has at least one threaded section for screwing in a screw contour located at the outer circumference of the dust removal hose body.

\* \* \* \* \*